United States Patent
Perugini et al.

(10) Patent No.: US 12,518,117 B2
(45) Date of Patent: Jan. 6, 2026

(54) ADJUSTABLE CAMERA SELECTION AND AUTOFOCUS EVALUATION

(71) Applicant: Datalogic IP Tech, S.r.l., Bologna (IT)

(72) Inventors: Luca Perugini, Bologna (IT); Lamberto Leoncavallo, Bologna (IT)

(73) Assignee: Datalogic IP Tech, S.r.l., Bologna (IT)

(*) Notice: Subject to any disclaimer, the term of this patent is extended or adjusted under 35 U.S.C. 154(b) by 0 days.

(21) Appl. No.: 19/057,336

(22) Filed: Feb. 19, 2025

(65) Prior Publication Data

US 2025/0328741 A1    Oct. 23, 2025

Related U.S. Application Data

(60) Provisional application No. 63/637,249, filed on Apr. 22, 2024.

(51) Int. Cl.
*G06K 7/10*    (2006.01)

(52) U.S. Cl.
CPC ................ *G06K 7/10831* (2013.01)

(58) Field of Classification Search
CPC .................................. G06K 7/10831
See application file for complete search history.

(56) References Cited

U.S. PATENT DOCUMENTS

| | | |
|---|---|---|
| 5,837,987 A | 11/1998 | Danielson et al. |
| 8,201,740 B2 | 6/2012 | Vinogradov et al. |
| 8,899,484 B2 | 12/2014 | Trajkovic et al. |
| 9,185,306 B1 | 11/2015 | Tan et al. |
| 9,646,188 B1 | 5/2017 | Kuchenbrod et al. |
| 9,800,749 B1 | 10/2017 | Tan et al. |
| 10,244,180 B2 | 3/2019 | Tan et al. |
| 10,268,854 B1 | 4/2019 | Tan et al. |
| 10,489,623 B1 | 11/2019 | Handshaw et al. |
| 10,803,272 B1 | 10/2020 | Deshmukh et al. |
| 11,245,845 B2 | 2/2022 | Giordano et al. |

(Continued)

FOREIGN PATENT DOCUMENTS

| | | |
|---|---|---|
| CN | 103649676 | 3/2014 |
| JP | H09211127 | 8/1997 |
| WO | 2014174148 | 10/2014 |

OTHER PUBLICATIONS

MC9300 Handheld Mobile Computer, Product Spec Sheet, Zebra, © 2019.

(Continued)

*Primary Examiner* — Jamara A Franklin
(74) *Attorney, Agent, or Firm* — Cozen O'Connor

(57) ABSTRACT

An optical scanner determines ranging to a subject using a localization phase in which a series of image frames is received which collectively contains an aimer spot captured as a reflection off of a surface of the subject. The optical scanner includes an idle phase in which the optical scanner remains idle with respect to parameter setting and evaluation but is configured to detect scene changes within its field of view, an initial phase that is entered into after the idle phase responsive to an activation event and not detecting a scene change, the initial phase including a configuration based operational parameter setting with a plurality of different configurations, and a decode phase that is entered into after the idle phase responsive to an activation event and detecting a scene change.

20 Claims, 8 Drawing Sheets

(56) References Cited

U.S. PATENT DOCUMENTS

| | | | |
|---|---|---|---|
| 2002/0043561 A1 | 4/2002 | Tsikos et al. | |
| 2002/0139853 A1 | 10/2002 | Tsikos et al. | |
| 2006/0043191 A1 | 3/2006 | Patel et al. | |
| 2006/0118635 A1 | 6/2006 | Joseph et al. | |
| 2007/0003105 A1 | 1/2007 | Nakamura et al. | |
| 2007/0181692 A1 | 8/2007 | Barkan et al. | |
| 2009/0084851 A1 | 4/2009 | Vinogradov et al. | |
| 2011/0157373 A1 | 6/2011 | Ye et al. | |
| 2014/0293829 A1* | 10/2014 | Visuri | H04W 64/003 370/254 |
| 2015/0144699 A1 | 5/2015 | Sackett et al. | |
| 2017/0280028 A1 | 9/2017 | Tan et al. | |
| 2017/0289451 A1 | 10/2017 | Wittenberg et al. | |
| 2017/0343345 A1 | 11/2017 | Wittenberg et al. | |
| 2018/0024974 A1 | 1/2018 | Welinder et al. | |
| 2018/0124299 A1 | 5/2018 | Brook | |
| 2019/0007269 A1* | 1/2019 | Ackley | H04L 41/0836 |
| 2019/0087618 A1 | 3/2019 | Lei et al. | |
| 2019/0182413 A1 | 6/2019 | Tan et al. | |
| 2019/0228195 A1 | 7/2019 | Lozano et al. | |
| 2020/0320259 A1 | 10/2020 | Stagg et al. | |

OTHER PUBLICATIONS

Dabrowski et al. "QR Inception: Barcode-in-Barcode Attacks" 2014.
DS36X8 Digital Scanner Product Reference Guide, MN-002689-13-EN, Revision A, , 618 Pages, Sep. 2021.

\* cited by examiner

ADJUSTABLE CAMERA SELECTION AND AUTOFOCUS EVALUATION

PRIOR APPLICATION

This Application claims the benefit of U.S. Provisional Application Ser. No. 63/637,249 filed Apr. 22, 2024, entitled "ADJUSTABLE SMART CAMERA SELECTION AND AUTOFOCUS EVALUATION," the disclosure of which is incorporated by reference herein.

TECHNICAL FIELD

The present disclosure generally relates to automated vision and, more particularly, to capturing and processing of images containing subject matter of interest such as machine-readable symbols or patterns.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

Optical scanners offer the versatility of being able to capture many different types of symbols and at different distances from the reader. State-of-the-art optical scanners use multiple cameras with different fields of view to capture multiple images of the subject, and use image processing techniques to determine the best image for symbol reading. Such scanners may employ autofocus systems that focus the optics of a camera at the correct distance.

Autofocus techniques may be passive or active. Passive autofocus makes a complete focus sweep while evaluating the image contrast and deciding which focus setting produces the greatest contrast and is thus the best one to use. This approach is a type of closed-loop system that is reliable but slow, resulting in unacceptable latency that adversely affects the usability of the scanner device.

Active autofocus techniques can be significantly faster than passive autofocus techniques. Active autofocus uses an auxiliary measurement system that emits a signal which is not part of the image to be captured, and senses a reflection of the emitted signal from the target's surface. These include such technologies as time-of-flight sensors, laser triangulation, phase-shift measurement, and ultrasound measurement, among others. Active autofocus techniques provide some measure (such as turn-around delay, phase shift, or dot-displacement inside the received image, etc.) that can indicate the distance from the scanner to the target. In turn, the measured distance is used to set the correct focus position. Active autofocus systems are open-loop systems that may be fast, but their accuracy reliability is dependent on the performance of the auxiliary measurement system.

One type of challenge faced by active autofocus systems is the presence of interference that can affect the performance of their auxiliary measurement systems. For instance, in auxiliary measurement systems using light-based signal emissions, such as laser spots, other light sources or reflections appearing within the field of view of one or more of the cameras of the scanner device might confuse an auxiliary measurement system into interpreting such interference as a reflection of an emitted signal, or they may prevent reliable reception of the desired emitted-signal reflection from the target surface. Such challenges may be particularly problematic in long-distance scanning applications where the target surface and the symbol to be read constitutes a small fraction of the captured images, and where the captured images contain more of the background scenery, which is of no interest to the scanning operation and presents a greater chance of presenting optical interference to the scanning device.

BRIEF SUMMARY

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

Optical scanners offer the versatility of being able to capture many different types of symbols and at different distances from the reader. State-of-the-art optical scanners use multiple cameras with different fields of view to capture multiple images of the subject, and use image processing techniques to determine the best image for symbol reading. Such scanners may employ autofocus systems that focus the optics of a camera at the correct distance.

Autofocus techniques may be passive or active. Passive autofocus makes a complete focus sweep while evaluating the image contrast and deciding which focus setting produces the greatest contrast and is thus the best one to use. This approach is a type of closed-loop system that is reliable but slow, resulting in unacceptable latency that adversely affects the usability of the scanner device.

Active autofocus techniques can be significantly faster than passive autofocus techniques. Active autofocus uses an auxiliary measurement system that emits a signal which is not part of the image to be captured, and senses a reflection of the emitted signal from the target's surface. These include such technologies as time-of-flight sensors, laser triangulation, phase-shift measurement, and ultrasound measurement, among others. Active autofocus techniques provide some measure (such as turn-around delay, phase shift, or dot-displacement inside the received image, etc.) that can indicate the distance from the scanner to the target. In turn, the measured distance is used to set the correct focus position. Active autofocus systems are open-loop systems that may be fast, but their accuracy reliability is dependent on the performance of the auxiliary measurement system.

One type of challenge faced by active autofocus systems is the presence of interference that can affect the performance of their auxiliary measurement systems. For instance, in auxiliary measurement systems using light-based signal emissions, such as laser spots, other light sources or reflections appearing within the field of view of one or more of the cameras of the scanner device might confuse an auxiliary measurement system into interpreting such interference as a reflection of an emitted signal, or they may prevent reliable reception of the desired emitted-signal reflection from the target surface. Such challenges may be particularly problematic in long-distance scanning applications where the target surface and the symbol to be read constitutes a small fraction of the captured images, and where the captured images contain more of the background scenery, which is of no interest to the scanning operation and presents a greater chance of presenting optical interference to the scanning device.

In some aspects, the techniques described herein relate to an apparatus of an optical scanner for scanning a subject, the apparatus including: interface circuitry including an input to receive a plurality of images of a scene from at least one image-capture device; and controller circuitry coupled to the interface circuitry and the input, the controller circuitry operative to cause the optical scanner to perform: an idle phase wherein the optical scanner remains idle with respect to image-acquisition parameter setting and image processing corresponding to reading of the subject, except that the controller circuitry is operative to cause the optical scanner to detect any scene change within its field of view occurring since a previous scene evaluation operation; a decode phase that is entered into after the idle phase, in response to an activation event, and in response to the optical scanner detecting during the idle phase of an occurrence of a scene change since the previous scene evaluation operation, wherein the decode phase includes: performance of a scene evaluation operation that takes measurements of a current scene to determine the operational parameters; acquisition of an image using the at least one image-capture device according to the determined operational parameters; and processing of the image to perform a reading of the subject; and an initial phase that is entered into after the idle phase, in response to an activation event, and in response to the optical scanner not detecting during the idle phase of any occurrence of a scene change since the previous scene evaluation operation, wherein the initial phase includes: selection of a predefined configuration of operational parameters for an image acquisition operation without performance of any scene evaluation operation; acquisition of an image using the at least one image-capture device according to the selected predefined configuration of operational parameters; and processing of the image to perform a reading of the subject.

In some aspects, the techniques described herein relate to a method of operating an optical scanner for scanning a subject, the method including: receiving, by the optical scanner, a plurality of images of a scene from at least one image-capture device; performing, by the optical scanner, an idle phase wherein the optical scanner remains idle with respect to image-acquisition parameter setting and image processing corresponding to reading of the subject, except that the optical scanner detects any scene change within its field of view occurring since a previous scene evaluation operation; performing, by the optical scanner, a decode phase that is entered into after the idle phase, in response to an activation event, and in response to the optical scanner detecting during the idle phase of an occurrence of a scene change since the previous scene evaluation operation, including: performing a scene evaluation operation that takes measurements of a current scene to determine the operational parameters; acquiring an image using the at least one image-capture device according to the determined operational parameters; and processing the image to perform a reading of the subject; and performing, by the optical scanner, an initial phase that is entered into after the idle phase, in response to an activation event, and in response to the optical scanner not detecting during the idle phase of any occurrence of a scene change since the previous scene evaluation operation, wherein the initial phase includes: selecting a predefined configuration of operational parameters for an image acquisition operation without performance of any scene evaluation operation; acquiring an image using the at least one image-capture device according to the selected predefined configuration of operational parameters; and processing the image to perform a reading of the subject.

DETAILED DESCRIPTION

Figure 1:
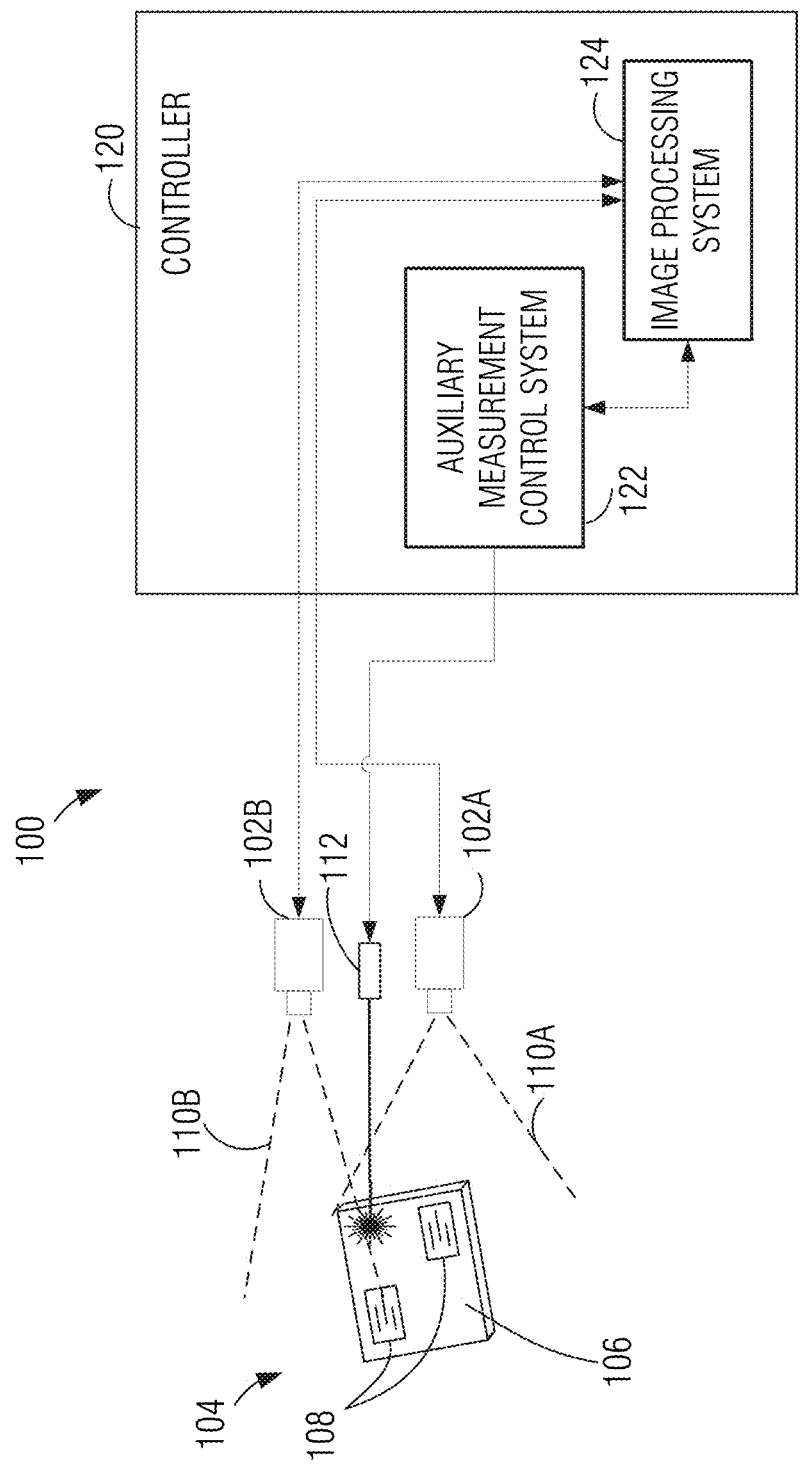
FIG. 1 is a simplified block diagram illustrating an implementation of a scanning system, according to at least one example.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Embodiments of the disclosure relate to multi-camera and autofocus systems configured to automatically select the correct configuration required for the current scene. For example, a lens position may be adjusted in a way to improve (e.g., maximize) focus and a camera and illuminator may be selected based on target characteristics. Information from the scene may be used to perform this configuration, such as target distance, image contrast, and brightness. To improve snappiness, the system may be fast to react to scene changes that would render the last information acquired stale. In long range barcode readers, targets can change from few centimeters distance to many meters in a few frames. Various techniques may be utilized to re-evaluate distance and other features when the scene changes, but it may also be desirable to select a configuration based on a particular application. Embodiments of the disclosure may, therefore, improve snappiness in dual camera and/or autofocus systems by selecting a camera, illuminator, and autofocus in a way that may be tuned for its current application. With the ability to adapt to customer use cases and/or to dynamically adapt to the current application may provide an improvement on the overall system snappiness and performance in comparison to conventional systems. While configurable options for the initial phase may be improvements on specific applications, an adaptive initial phase may be an improvement for many applications without a significant drawback and without an increase in target cost.

Some aspects of the present disclosure provide an image-based optical scanning system having multiple image-capture devices. Laser triangulation may be an effective way to acquire distance information from the scene. This triangulation may be performed right after trigger press, to start the scanner in the correct configuration, and then re-evaluated periodically. This may be convenient in applications where there are continuous changes between near and far targets but conventional methods may not be desirable when the application has few distance changes and one distance (i.e., close range) is more important than others because there is a delay introduced by the triangulation (in the order of tens of milliseconds). This delay increases time to read with respect to single camera scanners if the application requires reading only in the near field. Embodiments may provide additional flexibility of the system to cover more applications by tuning camera selection and autofocus position based on the current application. As a result, snappiness may also be improved.

FIG. 1 is a simplified block diagram illustrating an implementation of a scanning system 100, according to at least one example. As discussed further below, the scanning system 100 may be employed to capture multiple images of a subject 104, such as a machine-readable symbol or set of symbols 108 (e.g., barcode, 2D barcode, image-encoded information such as a digital watermark, printed characters or text), or a machine-detectable or -recognizable object 106. Scanning system 100 may read, recognize, detect, or perform other automated analytical processing of the subject. For the sake of brevity, operations such as these will be referred to in the present context as "reading."

Aspects of the disclosure may likewise be used in other areas of automated vision, such as automated guided vehicles (AGVs), robotics, automated driving, and machine-vision (MV) systems. The embodiments described below are in the context of visual symbol-reading, but principles of the present technologies relating to localization or ranging are likewise applicable in a multitude of other areas.

Scanning system 100 includes multiple image-capture devices, 102A-102B (collectively, image-capture devices 102). In this example, two image-capture devices 102A, 102B are shown for clarity; however, it will be understood that additional image-capture devices may be employed. Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent.

Each image-capture device 102 may be assembled together with optical components, such as an objective, microlens array, or the like. In other examples, more than one individual image-capture device may share a common optical system. Image-capture devices 102A-102B may be constructed using any suitable technology, whether known or arising in the future. Without limitation, some examples include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, Quanta Image Sensors, Hyperspectral sensors, Polarized sensors, Image sensors embedding AI capabilities, or the like. In related implementations, the set of image-capture devices 102 that are employed in scanning system 100 include sensors of diverse types, such as a grouping that includes conventional image sensor and a HDR image sensor, for example.

As shown in the example of FIG. 1, image-capture devices 102A-102B have respective fields of view 110A-110B. In related examples, the various image-capture devices 102 have different optical characteristics. For instance, image-capture device 102A may be a near-field camera, whereas image-capture device 102B may be a far-field camera. In other examples, the image-capture devices 102 have the same optical characteristics. As another useful feature in some embodiments, the image-capture devices 102 are situated in a specific spaced relationship with one another.

Scanning system 100 further includes aimer projector 112, which may be a laser emitter as depicted. Aimer projector 112 is situated at a fixed position relative to image-capture devices 102A-102B. As will be discussed in greater detail below, in some embodiments, the positional offset between each image-capture device 102 and aimer projector 112 facilitates determination of ranging to the target surface using a triangulation technique.

Image-capture devices 102 and aimer projector 112 are interfaced with controller 120, which includes auxiliary measurement control system circuitry 122 and image processing system circuitry 124. In some embodiments, each image-capture device 102 and aimer projector 112 may be communicatively coupled to controller 120 through a wired or wireless medium. In a related embodiment, a network (e.g., LAN, WAN, PAN, Internet) may facilitate the communicative coupling. In some embodiments, the image-capture device 102 may be connected directly to controller 120 through a suitable local interface (e.g., I²C, USB, SPI, UART, I³C) or may be integrated with controller 120 and interconnected using an internal interconnect such as a suitable variant of a peripheral component interconnect (PCI), serial AT Attachment (SATA), mobile industry processor interface (MIPI), or other interconnects known by those skilled in the art.

Auxiliary measurement control system 122 is operative in concert with image processing system 124 to coordinate the operation of aimer projector 112 and image-capture devices 102A-102B to measure the ranging to a target surface of subject 104. Image-capture devices 102 are communicatively coupled to image processing system 124, which is configured to receive the captured images and perform the processing operations for determining the ranging, setting operational parameters to facilitate image capture of subject 104 based on the ranging, and capture the images of subject 104 to perform reading of subject 104.

For determining the ranging, image processing system 124 is coupled to auxiliary measurement control system 122 so that the two may exchange relevant data and commands. For instance, image sensor frame capture signaling may be supplied by image processing system 124 to auxiliary measurement control system 122, so that the latter may adjust the activation of the laser spot within frames of the captured images.

Figure 2:
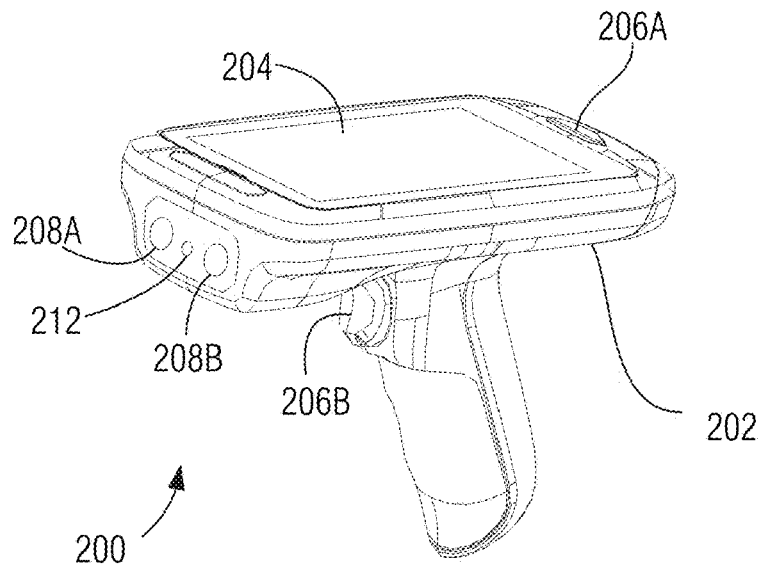
FIG. 2 is a diagram illustrating handheld reader 200 as one example implementation of scanning system.

FIG. 2 is a diagram illustrating handheld reader 200 as one example implementation of scanning system 100. Handheld reader 200 includes housing 202, display 204, and pushbutton controls 206A and 206B. As depicted, handheld reader 200 also includes forward-facing cameras 208A and 208B positioned in a spaced-apart relationship so as to have partially overlapping fields of view. A forward-facing laser emitter 212 is provided to facilitate ranging to the subject. Laser emitter 212 may work in concert with one or all of the cameras 208A, 208B according to a triangulation technique in which a position of the laser spot within the field of view of one or both of the cameras is indicative of the distance to the subject. The ranging measurements may be used as input (among other inputs) to determine operational parameters such as selection of image sensor for subsequent information processing, focus setting, illumination power, and other settings.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
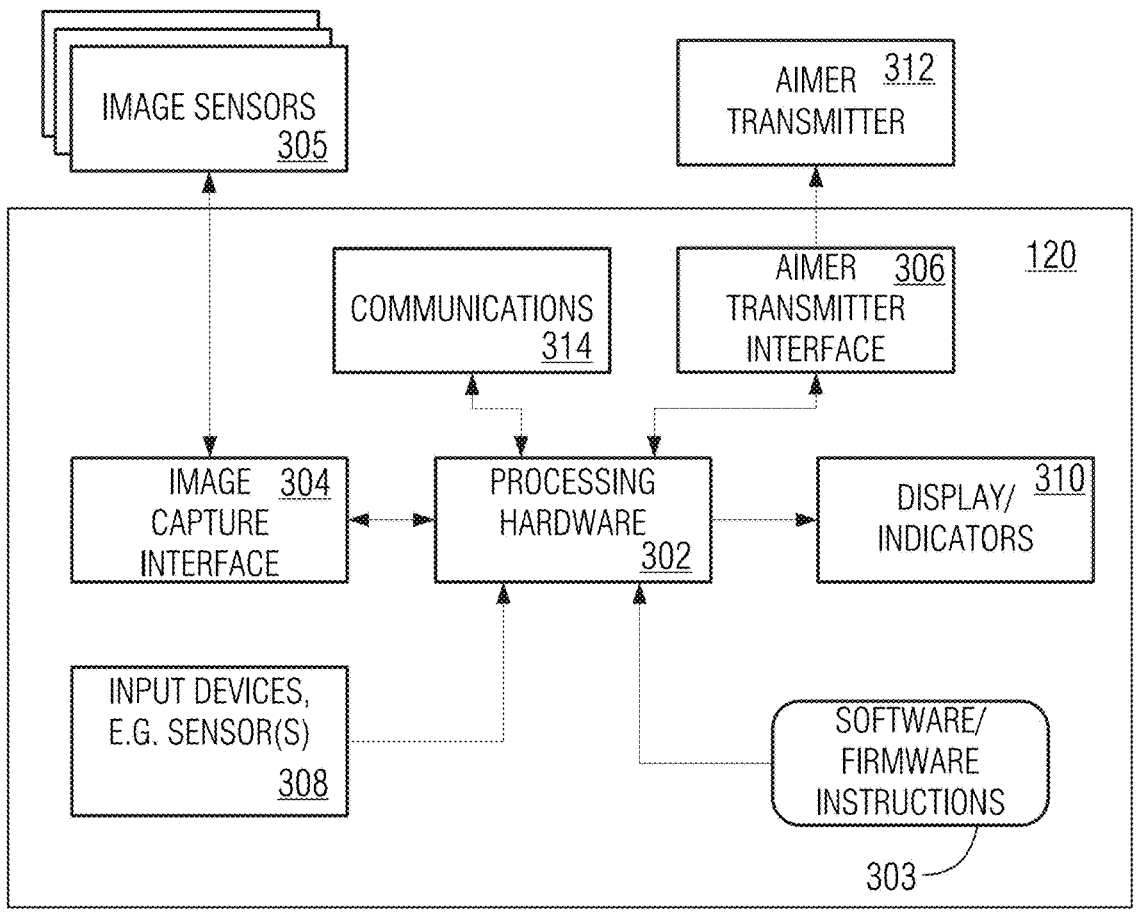
FIG. 3 is a high-level block diagram illustrating an example system architecture of a scanning system, with various components of a controller shown.

FIG. 3 is a high-level block diagram illustrating an example system architecture of scanning system 100, with various components of controller 120 shown. Controller 120 includes processing hardware 302 operatively coupled to image capture interface 304, input devices 308, display or indicators 310, communications circuitry 314, and aimer projector interface 306. Processing hardware 302 includes one or more processor circuits that execute software or firmware instructions 303, with the latter being stored in a non-transitory machine-readable medium such as a read-only memory, flash memory, random-access memory, or the like.

Controller 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 304 includes circuitry facilitating the exchange of data between processing hardware 302 and image sensors 305. In some examples, image capture interface 304 includes data buffers, video decoders, video encoders, address and data bus interfaces, serial data receiver/transmitter circuitry, analog-to-digital (A/D) converter circuitry, and the like. The data communications portions of image capture interface 304 may facilitate wired or wireless communication. Image capture interface 304 is operative to pass video frames from their original format as output by each of image sensors 305 to processing hardware 302 in a suitable data format to be read by processing hardware 302. Image capture interface 304 and processing hardware 302 may work in concert to implement image processing system 124 (FIG. 1).

In a related example, image capture interface 304 may additionally be configured to pass information from processing hardware 302 to one or more of image sensors 305. This upstream information may include configuration commands such as sensor gain settings, frame rate, exposure control, activation/deactivation commands, etc.

In some embodiments, image capture interface 304 may be integrated as part of a digital signal processor (DSP) device or microcontroller device. In other embodiments, image capture interface 304 may be integrated as part of one or more image sensors 305.

Aimer projector interface 306 includes circuitry to control the operation of aimer projector 312. Aimer interface 306 may include current regulator circuitry, switching circuitry, or the like. Aimer projector 312 may include a solid-state laser emitter having a wavelength that is within the light-detection range of image sensors 305. Aimer projector interface 306, and processing hardware 302 may work in concert to implement auxiliary measurement control system 122 (FIG. 1).

Input devices 308 include user-operable controls, such as pushbuttons, keypad, touchscreen, and the like, as well as additional sensors, such as a ranging sensor, motion sensor, accelerometer, gyroscope, fusion sensor which combines readings of multiple distinct sensors to provide a sensor output, etc. Display or indicators 310 include devices such as a liquid-crystal display (LCD), LED indicators, speaker or buzzer, and other suitable output devices.

Communications circuitry 314 includes wired or wireless communications facilities that provide input and output to and from processing hardware 302. Communication circuitry may include one or more of the following types of communication circuits: universal serial bus (USB), CAN, $I^2C$, SPI, UART, $I^3C$, Ethernet, personal-area network such as Bluetooth according to an IEEE 802.15 standard, Wi-Fi according to an IEEE 802.11 standard, or the like.

Figure 4B:
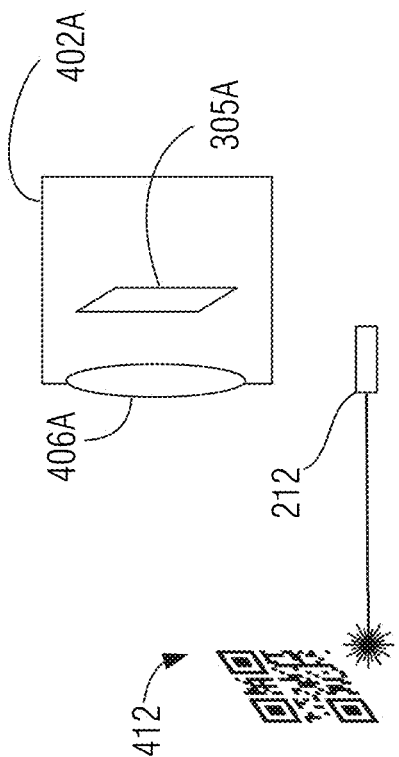
FIGS. 4A-4B are simplified schematic diagrams that illustrate arrangements that may be employed as examples of one or more image-capture devices such as image-capture devices.
Figure 4A:
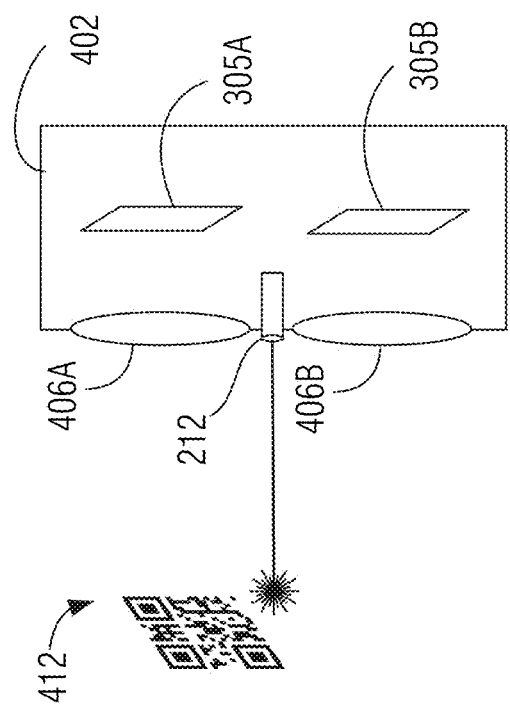

FIGS. 4A-4B are simplified schematic diagrams that illustrate arrangements that may be employed as examples of one or more image-capture devices such as image-capture devices 102. FIG. 4A illustrates an example arrangement consistent with handheld reader 200 described above with reference to FIG. 2. A single enclosure 402 houses image sensors 305A and 305B, each arranged with a corresponding objective 406A and 406B. Laser emitter 212 is also shown. As described above, laser emitter 212 may be used to place a spot on a surface containing subject 412, and video frames captured by image sensors 305A and 305B may be evaluated to determine the ranging to subject 412. FIG. 4B illustrates an example with separate enclosures, 402A and 402B, each having a corresponding image sensor 305A, 305B and objective 406A, 406B. Laser emitter 212 may be situated independently from either enclosure 402A or 402B, or it may be situated in one of the enclosures 402A or 402B.

Figure 5:
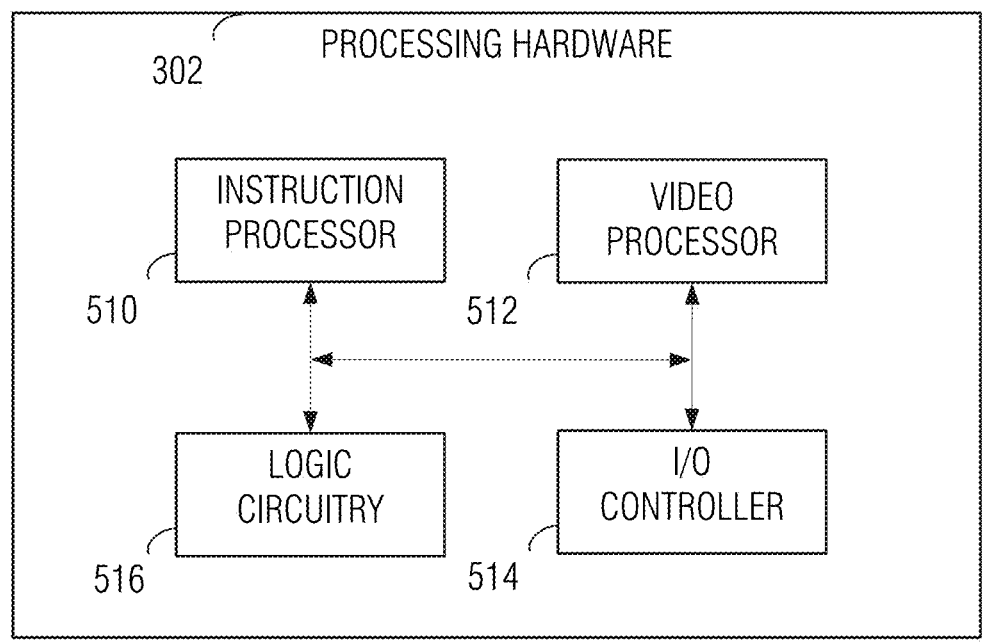
FIG. 5 is a simplified block diagram illustrating a portion of processing hardware of a controller according to one example.

FIG. 5 is a simplified block diagram illustrating a portion of processing hardware 302 of controller 120 according to one example. Processing hardware 302 includes instruction processor 510, video processor 512, and input/output (I/O) controller 514. Instruction processor 510 is constructed to execute software or firmware instructions 303, the execution of which causes instruction processor 510 to implement engines to carry out the overall functionality of scanning system 100 in conjunction with the other components of controller 120, image sensors 305, and aimer projector 312 as shown in FIG. 3. For instance, instruction processor 510 may reads input devices 308 and take actions in response to those inputs; instruction processor 510 may write output to display or indicators 310; and instruction processor 510 may exchange data with communications circuitry 314 to send and receive data to or from other devices. In addition, instructions 303, when executed by instruction processor 510, may causes instruction processor 510 to carry out localization and triangulation operations to determine ranging to the subject as described in greater detail below in accordance with some embodiments.

Instruction processor 510 may be of any suitable architecture. As an example, instruction processor 510 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

Video processor 512 is interfaced with instruction processor 510, and implements engines to receive captured images from image-capture devices 102, and to resample, crop, compress, or combine portions of images, filter, evaluate visual characteristics of the captured images, determine the location of captured visual elements within the image frame (such as the location of the laser spot produced by laser emitter 212), and perform symbol reading or object detection algorithms. In some embodiments, video processor 512 includes a digital signal processor (DSP) core having a computing architecture that is optimized for video processing and including additional or specialized arithmetic logic units (ALUs), direct-memory access, fixed-point arithmetic, etc., ASIC, FPGA, CPLD, or combination thereof.

I/O controller 514 includes circuitry that facilitates addressing, data transfer, memory access, and other interactions between instruction processor 510, video processor 512, and the other components of controller 120. As examples, I/O controller 514 may include a bus or system interconnect controller, a serial communications hub controller, or the like.

In related embodiments, instruction processor 510 and video processor 512 are integrated as a single processing device, such as a digital signal controller (DSC) that is configured to perform the respective functionality of instruction processor 510 and video processor 512 described above. Similarly, I/O controller 514 may also be integrated as part of a DSC implementation. In other related embodiments, some portion of processing hardware 302 may be implemented with logic circuitry 516, such as an application-specific integrated circuit (ASIC), FPGA, CPLD, hardware coprocessor, or the like. Logic circuitry 516 may be utilized to perform certain operations with greater speed or power efficiency than can be conventionally achieved using an instruction processor, such as image filtering, image frame combining, localization, or the like. Additional details regarding additional components of the system and related operational features (e.g., autofocus, localization, etc.) may be similar to those described in U.S. patent Ser. No. 17/118, 374, filed Dec. 10, 2020, and entitled "Aimer Localization and Triangulation in Multi-Sensor Scanner," the entire disclosure of which is incorporated herein by this reference.

Figure 6:
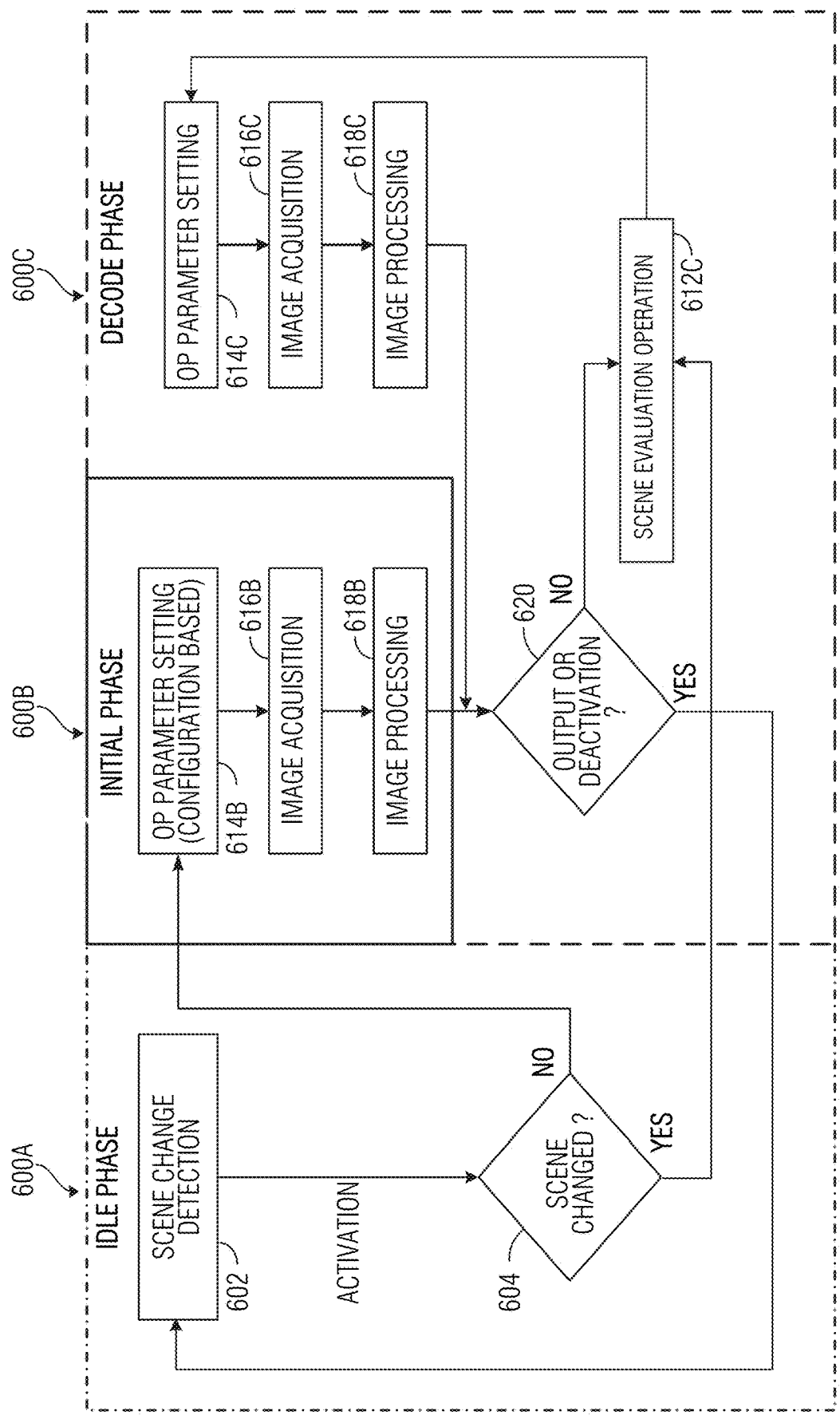
FIG. 6 is a high-level state diagram illustrating a simplified operational regime of a controller executing a method according to an example embodiment.

FIG. 6 is a high-level state diagram illustrating a simplified operational regime of controller 120 executing a method according to an example embodiment. The states include an idle phase 600A, an initial phase 600B, and a decode operation 600C. Among these phases, idle phase 600A is the least computationally expensive. initial phase 600B is more computationally expensive than idle phase 600A but less so than decode phase 600C. Decode phase 600C is the most computationally expensive among the three phases.

During the idle phase 600A, controller 120 remains idle with respect to parameter setting, evaluation, and processing of images to read a symbol; however, controller 120 may operate to detect scene changes within the field of view of the handheld reader 200 at operation 602.

The initial phase 600B (for a configurable number of frames) may be performed before scene evaluation (e.g., laser triangulation). In some embodiments, initial phase 600B is optimized for the current application depending on whether a scene change is detected. If the initial phase 600B is initiated, the scanning system 100 may be configured in one of the following ways based on the application:

Targets at different unknown distances, which calls for distance measurement (e.g., laser triangulation). This configuration of scanning system 100 simply bypasses initial phase 600B and advances the operational state to scene evaluation at 612C.

Targets predominantly at close distance, which calls for the initial phase 600B to be configured for the near range: e.g., near illuminator, near camera and near focus distance (as applicable).

Targets predominantly at far distance, which calls for initial phase 600B to be configured for the far range: e.g., far illuminator, far camera and far focus distance (as applicable).

No preferred distance but few distance changes, which calls for initial phase 600B to apply the most recent configuration which was used in the previous image acquisition operation. This setting, which keeps the most recent configuration optimizes the time to read (TTR) when the targets are at the same distance as before.

In cases where additional information is available, the initial phase 600B may be further configured to dynamically select appropriate parameter settings at every trigger start. For example, an available sensor, such as an accelerometer, gyroscope, fusion sensor may be read to determine or infer if a scene has changed between triggers. Based on whether that scene change has occurred, controller 120 may select whether to perform parameter-setting operations.

Some embodiments may include an advanced sensor and associated processing, such as an optical flow technique, that can provide motion information through the analysis of motion vectors without the need to analyze the image frames themselves. If, through any of these methods, the scene is not changed between triggers, initial phase 600B may be executed with parameters configured according to the previous parameter configuration of the most recent image acquisition operation. In this way, time is not spent on a scene evaluation operation that would probably confirm the same, already known, distance. Otherwise, if the scene is changed, it may be preferable to start directly with scene evaluation operation 612C because the prior triggered cycle's parameter settings are likely configured for the wrong distance.

At operation 604, in response to an activation event (e.g., trigger pull, button press, etc.) controller 120 may exit the idle phase 600A and enter initial phase 600B or decode phase 600C based on whether the scene has been determined during idle phase 600A to have changed.

Various ways are contemplated in which information can be acquired on scene change during idle time if additional sensors are available. According to various embodiments:

Where a motion sensor such as an accelerometer, gyroscope, or fusion sensor, is provided among input devices 308, the device's orientation is calculated at stop-trigger and at start-trigger events. If the two orientations are different by at least a defined threshold amount, controller 120 determines that the scanner has moved, and hence the scene has changed (and, in response, selects configuration 1 as described below).

Where a time of flight (ToF) sensor or object-detection sensor is available among input devices 308, a distance measure or object presence can be tracked starting at a trigger end event, and repeated (e.g., periodically) until the occurrence of a new trigger start event. If the distance measure or object presence has changed by at least a defined threshold amount, controller 120 determines that the scene has changed (and, in response, selects configuration 1 as described below).

Where an advanced sensor with optical flow is available among input devices 308, computed motion vectors are utilized to determine if the scene has changed. Details about the optical-flow sensing and use of motion vectors are described below. In one approach, an image sensor 305 can be kept on during idle phase 600A, and operated in a low-power mode to acquire only motion vectors instead of the full image or a readable image. To reduce power consumption, the image sensor 305 can be configured to acquire motion vector information only periodically. Sensor 305 may be configured to acquire motion vectors only for a specific region of interest (ROI) where the barcode is more likely to be present (around aimer coordinates, for example). According to one implementation, if motion vectors acquired have a magnitude that meets or exceeds a defined threshold at least once during idle phase 600A, controller 120 assesses that the scene has changed and configuration 1 as described below may be used for the ensuing image acquisition operations. Otherwise, configuration 4 as described below may be selected. In an example, $Q=\text{sum}(\text{sqrt }(dx^2+dy^2))$ can be an indication of the quantity of motion inside the scene.

In embodiments where an aiming mode is provided in the system that may be activated before triggering (such as double-press triggers), a scene evaluation operation can be expected to know whether or not the distance has changed because in this operation it is acceptable for the aimer to be turned on.

After idle phase 600A, and if the scene has changed as determined at decision 604, controller 120 may enter the decode phase 600C which may include scene evaluation operation 612C, operational parameter setting 614C, image acquisition 616C, and image processing 618C. Scene evaluation operation 612C is initiated in response to an activation event. In the example of a hand-triggered reader such as handheld reader 200, the activation event may be actuation of a pushbutton (e.g., trigger pull).

Scene evaluation operation 612C involves rapidly performing one or more measurements, such as a distance measurement, lighting conditions measurement, or other such measurement, in order to determine the mode of operation for image acquisition. In the case of distance measurement, the ranging to the subject may be determined using aimer projector 112 and auxiliary measurement control system 122 to produce a ranging measurement as part of initial assessment data. In some embodiments, the speed of scene evaluation operation 612C is maximized to provide minimal operational latency. As an example, scene evaluation operation 612C may be performed using a subset of the image frames in order to reduce the extent of image processing required to achieve initial assessment data.

Operational parameter setting 614C uses the initial assessment data resulting from scene evaluation operation 612C to set operational parameters such as selection of camera or image sensor, focus setting, exposure setting, image-sensor gain setting, active illumination (e.g., flash or light) setting, active illumination source selection (in embodiments utilizing multiple active illumination sources), or the like. Operational parameter setting 614C produces acquisition configuration data, which may include a command to set the focus, activate a flash or illumination, select a region of interest (ROI), or any combination of these and other available settings. Image acquisition operation 616C involves activating the selected image sensor according to the applicable operational parameters to capture one, or a series, of images. For example, the preferred image sensor may be selected for use, along with various settings for that image sensor, such as gain, exposure, etc.

Image processing 618C is generally performed on one or more captured images resulting from operation of image acquisition operation 616C. Image processing operations 618C include reading of the subject (e.g., symbol reading, text recognition, object detection, object recognition, etc.). Image processing 618C is a more computationally-expensive process than the initial assessment operations that are performed as part of scene evaluation operation 612C. In some embodiments, Image processing 618C is a more computationally-expensive process than the operations of initial phase 600B. The result of image processing 618C is an output which may be in the form of a data object indicating the data of a machine-readable symbol, recognized text or object, etc.

After idle phase 600A, and if the scene has not changed as determined at decision 604, controller 120 may enter initial phase 600B that includes operational parameter setting 614B, image acquisition 616B, and image processing 618B. Initial phase 600B may be tuned for the current application before any distance or scene evaluation is performed to optimize for applications where the time lost calculating distance is not justified by the use case where distance is changed only occasionally. In some embodiments, operational parameter setting 614B of initial phase 600B is based on predefined configurations, in which a set of available configurations are provided from which a preferred configuration may be selected.

Figure 7:
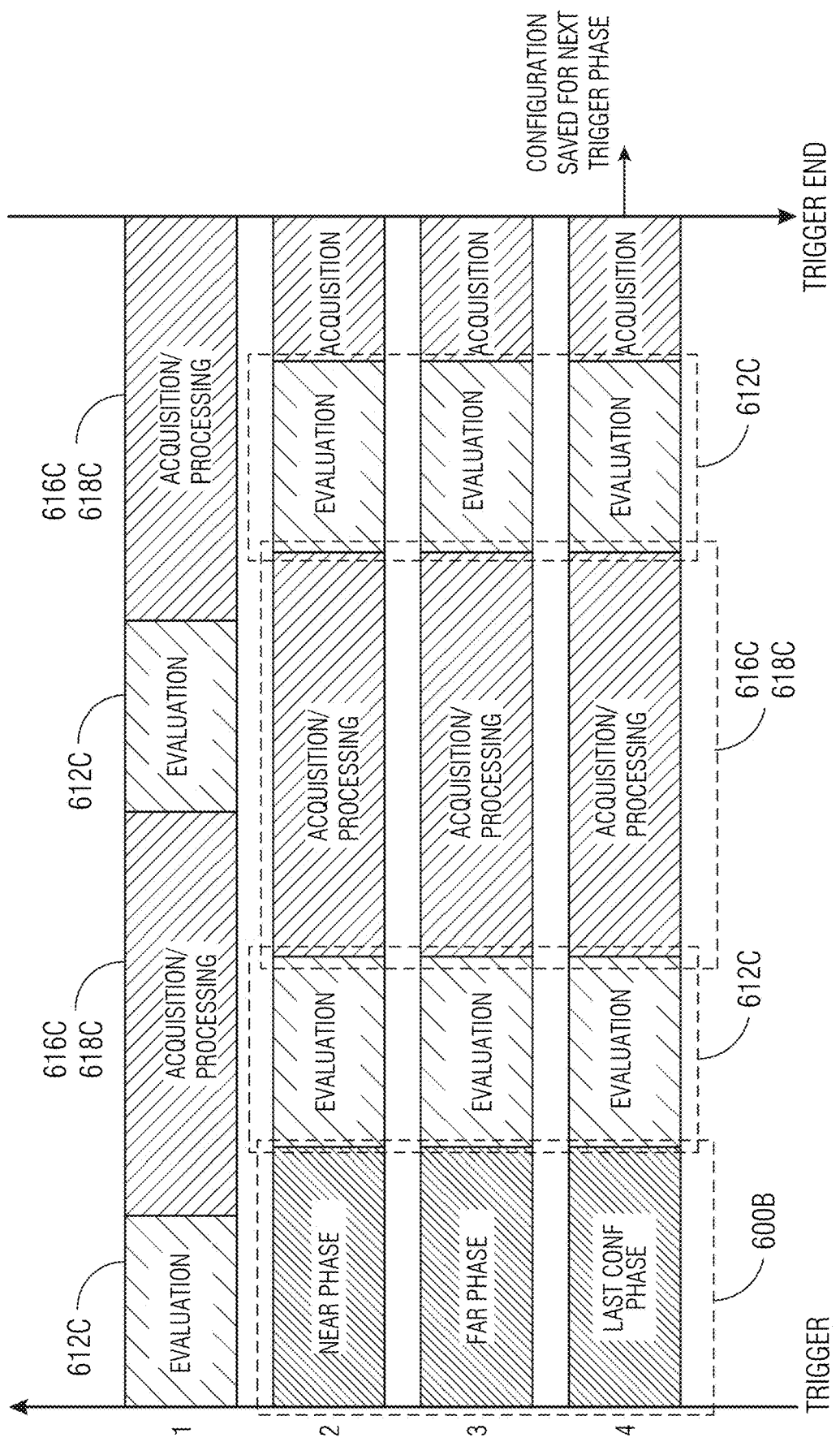
FIG. 7 is a timing diagram illustrating examples of the relative durations of various operations of configurations of operational parameters.

In some embodiments, a set of available predefined configurations includes a plurality of different configurations, some examples of which are described below. FIG. 7 is a timing diagram illustrating examples of the relative durations of various operations of configurations 1-4. As depicted, the operations in response to a trigger start event proceed until the trigger end event or until a decode is achieved sooner. As described in greater detail below, configurations 2-4 each includes a respective initial phase 600B that can avoid having to perform scene evaluation operation 612C if a decode is achieved in that initial phase 600B.

Configuration 1. No initial phase: distance is determined at scene evaluation operation 612C in response to every trigger start; some time is lost to calculate distance but after that the scanner is dynamically configured with the current scene characteristics. The illuminator, camera and, optionally, autofocus are always calculated from newly-measured information at operational parameter setting 614C (not specifically shown in the timing diagram since its duration is insubstantial) for acquisition operation 616C and image processing operation 618C (shown together).

Configuration 2. Near-field initial phase: after trigger start, a configurable number of frames are dedicated to the default near-field configuration (near-field camera, near-field illuminator and close autofocus distance if autofocus is provided) per operational parameter setting 614B (not shown). This option makes the scanner's speed comparable to single-camera readers that are optimized for only this working range. The near-field initial phase as shown in FIG. 7 is a type of initial phase 600B that includes image acquisition 616B and image processing 618B. If image processing 618B produces a decode output, as determined at decision 620, the process can be concluded (returning to idle phase 600A) without advancing to scene evaluation operation 612C. In Configuration 2, the distance is evaluated (as per scene evaluation operation 612C) only after initial phase 600B has elapsed without achieving a decode, in which case the scanner is configured to perform image acquisition at 616C using the distance determined as a result of the distance evaluation at scene evaluation operation 612C. In practice, Configuration 2 may be a desirable configuration for an application that is mostly near-field and only occasionally requires reading symbols at long range.

Configuration 3. Far-field initial phase: This configuration is analogous to Configuration 2, except that the default configuration for initial phase 600B is preset to the far-field settings, i.e., using the far-field camera, far-field illuminator, and far autofocus distance where autofocus is provided. Configuration 3 is applicable in use cases where most of the time is spent decoding targets at long range.

Configuration 4. Previous-configuration initial phase: in this case the previously-used configuration at the end of the previous image acquisition operation is stored and applied by default in initial phase 600B. Distance is the same as before and the camera, illuminator and autofocus position are kept as before until a new distance is evaluated at 612C if a decode is not achieved following initial phase 600B. This configuration is advantageous in cases where repeated reading operations are performed on symbols at the same distance. If the distance is unchanged, no time is lost calculating distance.

After initial phase 600B, per decision 620, the system either advances to scene evaluation operation 612C, or returns to automatic periodic evaluations of scene changes at 602. Following scene evaluation operation 612C, the illuminator, camera and autofocus (as applicable) are adjusted to match the new scene's conditions at operational parameter setting 614C. If conditions are changed after scene evaluation operation 612C, this information can also be provided to the decoding library to stop processing captured frames which were captured prior to the scene change detection or with settings that do not correspond with the newly-evaluated scene. This operation is particularly beneficial when all decoders are occupied. In this way, the scanner starts working immediately on frames from the new scene. These configurations are useful if the application is clear from the beginning and there is no need to adapt to changes in the symbol-reading scenario.

To further improve the use of these configurations when additional information about a target is available, adaptive selection can be used according to embodiments in which an additional type of configuration is available, i.e., configuration 5, which provides automatic switching between configurations 1 and 4. In particular, the automatic switching between configuration 1 and configuration 4 may be enough to cover all use cases with desirable system performance. Notably, configuration 1 may be desirable when the scene has changed, while configuration 4 is optimal when the scene has not changed. Information may be acquired before trigger start to determine if the scene has changed without losing decoding time to select the appropriate configuration.

Figure 8:
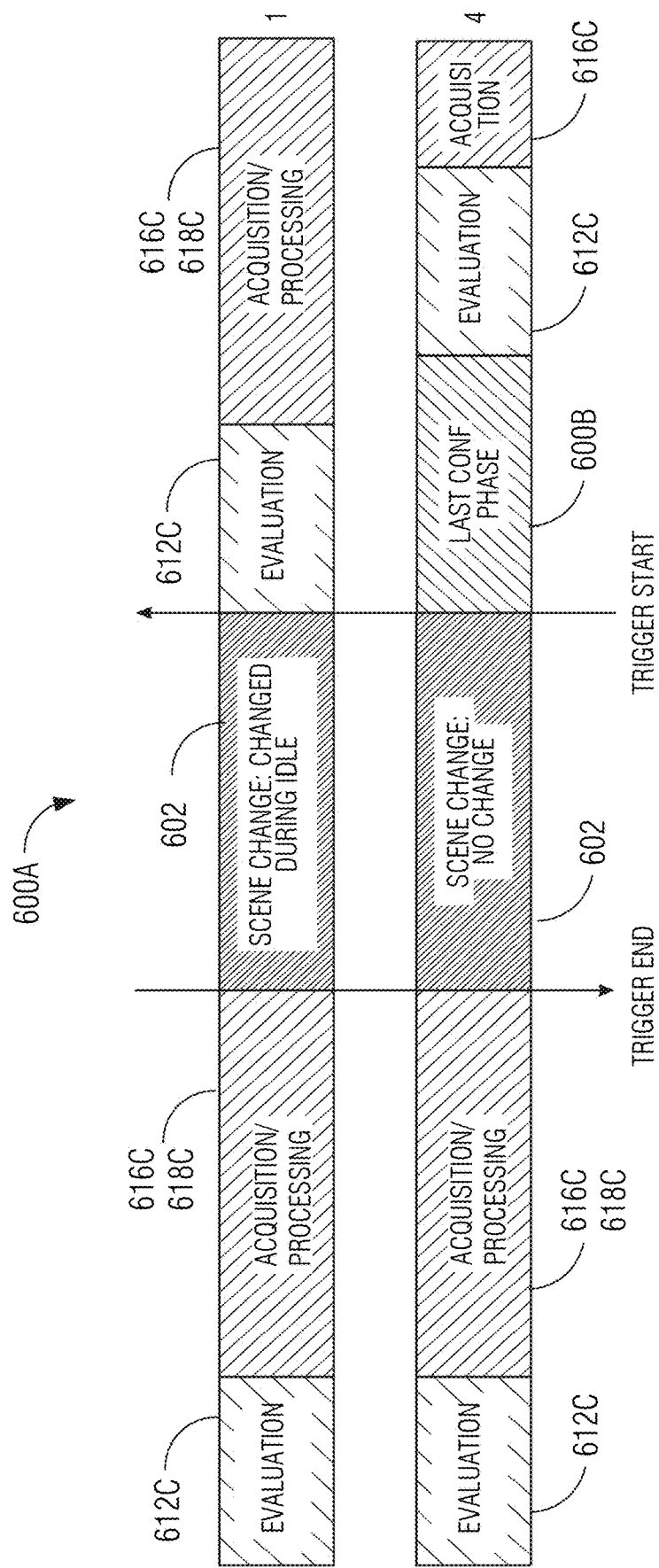
FIG. 8 is a timing diagram illustrating example sequences of operations for an arrangement in which a configuration from among configuration 1 and configuration 4 as described in connection with FIG. 7 is dynamically selected in response to detection of a scene change during an idle phase.

FIG. 8 is a timing diagram illustrating example sequences of operations for configuration 5, i.e., dynamically selecting a configuration from among configuration 1 and configuration 4 in response to detection of a scene change during idle phase 600A. As depicted in the timing diagram, idle phase 600A follows evaluation operation 612C and image acquisition and processing operations 616C and 618C. In idle phase 600A, scene change detection 602 is performed, the result of which determines either that the scene has changed, or that the scene has not changed. Based on this outcome, either configuration 1, or configuration 4 is selected as the operating mode following the trigger start.

In response to a determination by scene change detection operation 602 during idle phase 600A that the scene has changed, configuration 1 is selected, which performs scene evaluation operation 612C, followed by image acquisition 616C and image processing 618C operations using the illuminator, camera and autofocus (as applicable) operational parameter settings determined at 614C based on scene evaluation operation 612C.

On the other hand, if scene change detection operation 602 during idle phase 600A determines that the scene has not changed, configuration 4 is selected to use the prior settings in initial phase 600B. In this case, the prior settings are the settings which were determined as a result of the previous scene evaluation operation 612C as shown at the left end of the timing diagram. A decode may be produced as a result of the initial phase 600B without having to perform evaluation 612C and subsequent acquisition operations 616C shown at the right end of the timing diagram. If a decode has not been achieved during initial phase 600B, evaluation 612C and subsequent acquisition operations 616C may be performed.

Notably, the availability of initial phase 600B allows the system to forgo certain operations of decode phase 600C, which are more computationally expensive and require a longer duration to execute than the operations of initial phase 600B. However, this advantage is only realized when initial phase 600B is selected under the appropriate conditions (scene change vs. no scene change). Advantageously, since scene change detection 602 is carried out during idle phase 600A between triggered activations of the symbol reading device, selection of whether or not to carry our initial phase 600B is not costly in terms of perceptible latency (affecting user experience) after trigger starts.

Figure 9:
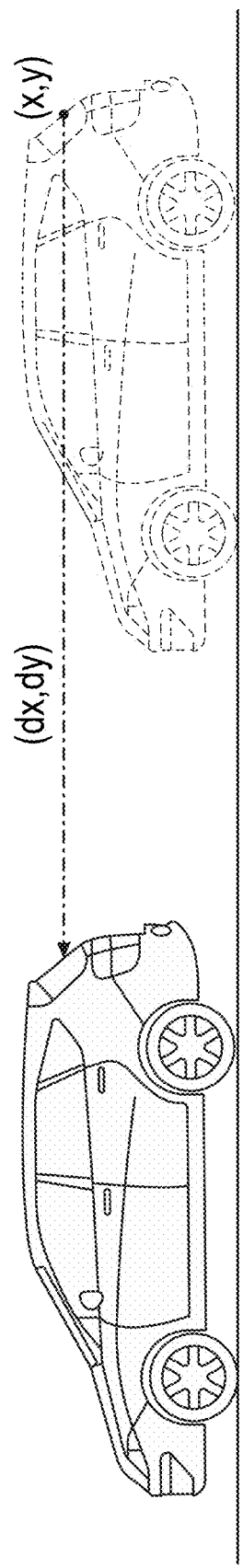
FIG. 9 is a diagram illustrating an example of motion vectors from advanced sensors with optical flow.

For embodiments including advanced image sensors with optical flow, Motion vectors may be calculated using two time-related frames. FIG. 9 is a diagram illustrating an example of motion vectors from advanced sensors with optical flow. In this example, motion vectors may be calculated as follows:
 a. Find edges (or more in general features) in first image with configurable thresholds on contrast change and size.
 b. Inside a region of interest (ROI) around each edge, find correlated edges in the second frame.
 c. If a correlated edge is found, define a motion vector as: (x,y) first image edge coordinate and origin of the vector, (dx,dy) distance between first and second image edge.

These vectors may be calculated in different ways, but the use of advanced sensors that can calculate the motion vectors directly in hardware is beneficial for improving system performance and reducing system complexity. There is a direct proportion between vector length and motion blur in the image and this can be used to define how much the scene is changing.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Additional Notes and Examples

Example 1 is an apparatus of an optical scanner for scanning a subject, the apparatus comprising: interface circuitry including an input to receive a plurality of images of a scene from at least one image-capture device; and controller circuitry coupled to the interface circuitry and the input, the controller circuitry operative to cause the optical scanner to perform: an idle phase wherein the optical scanner remains idle with respect to image-acquisition parameter setting and image processing corresponding to reading of the subject, except that the controller circuitry is operative to cause the optical scanner to detect any scene change within its field of view occurring since a previous scene evaluation operation; a decode phase that is entered into after the idle phase, in response to an activation event, and in response to the optical scanner detecting during the idle phase of an occurrence of a scene change since the previous scene evaluation operation, wherein the decode phase includes: performance of a scene evaluation operation that takes measurements of a current scene to determine the operational parameters; acquisition of an image using the at least one image-capture device according to the determined operational parameters; and processing of the image to perform a reading of the subject; and an initial phase that is entered into after the idle phase, in response to an activation event, and in response to the optical scanner not detecting during the idle phase of any occurrence of a scene change since the previous scene evaluation operation, wherein the initial phase includes: selection of a predefined configuration of operational parameters for an image acquisition operation without performance of any scene evaluation operation; acquisition of an image using the at least one image-capture device according to the selected predefined configuration of operational parameters; and processing of the image to perform a reading of the subject.

In Example 2, the subject matter of Example 1 includes, wherein the optical scanner is a symbol reading device, and wherein the reading of the subject includes a decoding of a machine-readable symbol.

In Example 3, the subject matter of Examples 1-2 includes, wherein the reading of the subject includes optical character recognition (OCT) of text.

In Example 4, the subject matter of Examples 1-3 includes, wherein the reading of the subject includes a recognition of an object.

In Example 5, the subject matter of Examples 1-4 includes, wherein in the initial phase, the selection of the predefined configuration of operational parameters is made from among a plurality of predefined configurations of operational parameters.

In Example 6, the subject matter of Example 5 includes, wherein the plurality of predefined configurations of operational parameters includes a first configuration having operational parameter values equal to the operational parameter values used most recently to perform acquisition of an image.

In Example 7, the subject matter of Examples 5-6 includes, wherein the plurality of predefined configurations of operational parameters includes a first configuration having operational parameter values corresponding to a near-field target, and a second configuration having operational parameter values corresponding to a far-field target.

In Example 8, the subject matter of Examples 1-7 includes, wherein the operational parameters include an illumination setting.

In Example 9, the subject matter of Examples 1-8 includes, wherein the operational parameters include an autofocus setting.

In Example 10, the subject matter of Examples 1-9 includes, wherein the at least one image-capture device includes a plurality of different image-capture devices, and wherein the operational parameters include a selection of a specific image-capture device from among the plurality.

In Example 11, the subject matter of Examples 1-10 includes, wherein the scene evaluation operation that takes measurements of a current scene includes at least one measurement selected from the group consisting of: distance measurement, lighting conditions measurement, or any combination thereof.

In Example 12, the subject matter of Examples 1-11 includes, wherein in the idle phase, the detection of any scene change within the field of view of the optical scanner occurring since a previous scene evaluation operation includes reading a motion sensor to detect movement of the optical scanner, and wherein a detected change of orientation of the optical scanner that exceeds a defined threshold is indicative of a scene change.

In Example 13, the subject matter of Examples 1-12 includes, wherein in the idle phase, the detection of any scene change within the field of view of the optical scanner occurring since a previous scene evaluation operation includes reading a proximity sensor to detect distance to an object, and wherein a detected change of distance that exceeds a defined threshold is indicative of a scene change.

In Example 14, the subject matter of Examples 1-13 includes, wherein in the idle phase, the detection of any scene change within the field of view of the optical scanner occurring since a previous scene evaluation operation includes reading the at least one image-capture device to measure a motion vector according to an optical flow technique, and wherein a measured motion vector that exceeds a defined threshold is indicative of a scene change.

In Example 15, the subject matter of Examples 1-14 includes, wherein in the idle phase, the detection of any scene change within the field of view of the optical scanner occurring since a previous scene evaluation operation includes performing an operation in a low-power mode of the at least one image-capture device.

In Example 16, the subject matter of Examples 1-15 includes, wherein the decode phase is more computationally expensive than the initial phase.

Example 17 is a method of operating an optical scanner for scanning a subject, the method comprising: receiving, by the optical scanner, a plurality of images of a scene from at least one image-capture device; performing, by the optical scanner, an idle phase wherein the optical scanner remains idle with respect to image-acquisition parameter setting and image processing corresponding to reading of the subject, except that the optical scanner detects any scene change within its field of view occurring since a previous scene evaluation operation; performing, by the optical scanner, a decode phase that is entered into after the idle phase, in response to an activation event, and in response to the optical scanner detecting during the idle phase of an occurrence of a scene change since the previous scene evaluation operation, including: performing a scene evaluation operation that takes measurements of a current scene to determine the operational parameters; acquiring an image using the at least one image-capture device according to the determined operational parameters; and processing the image to perform a reading of the subject; and performing, by the optical scanner, an initial phase that is entered into after the idle phase, in response to an activation event, and in response to the optical scanner not detecting during the idle phase of any occurrence of a scene change since the previous scene evaluation operation, wherein the initial phase includes: selecting a predefined configuration of operational parameters for an image acquisition operation without performance of any scene evaluation operation; acquiring an image using the at least one image-capture device according to the selected predefined configuration of operational parameters; and processing the image to perform a reading of the subject.

In Example 18, the subject matter of Example 17 includes, wherein the optical scanner is a symbol reading device, and wherein the reading of the subject includes decoding of a machine-readable symbol.

In Example 19, the subject matter of Examples 17-18 includes, wherein the reading of the subject includes optical character recognition (OCT) of text.

In Example 20, the subject matter of Examples 17-19 includes, wherein the reading of the subject includes a recognition of an object.

In Example 21, the subject matter of Examples 17-20 includes, wherein in the initial phase, the selection of the predefined configuration of operational parameters is made from among a plurality of predefined configurations of operational parameters.

In Example 22, the subject matter of Example 21 includes, wherein selecting a configuration from among the plurality of predefined configurations of operational parameters includes selecting a first configuration having operational parameter values equal to the operational parameter values used most recently to perform acquisition of an image.

In Example 23, the subject matter of Examples 21-22 includes, wherein selecting a configuration from among the plurality of predefined configurations of operational parameters includes selecting a first configuration having operational parameter values corresponding to a near-field target, and a second configuration having operational parameter values corresponding to a far-field target.

In Example 24, the subject matter of Examples 17-23 includes, wherein the at least one image-capture device includes a plurality of different image-capture devices, and wherein performing the initial phase or the decode phase includes setting operational parameters that include a selection of a specific image-capture device from among the plurality.

In Example 25, the subject matter of Examples 17-24 includes, wherein performing the scene evaluation operation includes taking measurements of a current scene includes at least one measurement selected from the group consisting of: distance measurement, lighting conditions measurement, or any combination thereof.

In Example 26, the subject matter of Examples 17-25 includes, wherein in the idle phase, the detecting of any scene change within the field of view of the optical scanner occurring since a previous scene evaluation operation includes reading a motion sensor to detect movement of the optical scanner, and wherein a detected change of orientation of the optical scanner that exceeds a defined threshold is indicative of a scene change.

In Example 27, the subject matter of Examples 17-26 includes, wherein in the idle phase, the detecting of any scene change within the field of view of the optical scanner occurring since a previous scene evaluation operation includes reading a proximity sensor to detect distance to an object, and wherein a detected change of distance that exceeds a defined threshold is indicative of a scene change.

In Example 28, the subject matter of Examples 17-27 includes, wherein in the idle phase, the detecting of any scene change within the field of view of the optical scanner occurring since a previous scene evaluation operation includes reading the at least one image-capture device to measure a motion vector according to an optical flow technique, and wherein a measured motion vector that exceeds a defined threshold is indicative of a scene change.

In Example 29, the subject matter of Examples 17-28 includes, wherein in the idle phase, the detecting of any scene change within the field of view of the optical scanner occurring since a previous scene evaluation operation includes performing an operation in a low-power mode of the at least one image-capture device.

In Example 30, the subject matter of Examples 17-29 includes, wherein performing the decode phase is more computationally expensive than performing the initial phase.

Example 31 is at least one machine-readable medium including instructions that, when executed by processing circuitry, cause the processing circuitry to perform operations to implement of any of Examples 17-30.

Example 32 is an apparatus comprising means to implement of any of Examples 17-30.

Example 33 is a system to implement of any of Examples 17-30.

Example 34 is a method to implement of any of Examples 1-16.

The embodiments above are intended to be illustrative and not limiting. Additional embodiments are within the claims. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f) are not to be invoked unless the specific terms "means for" or "step for" are recited in a claim.

What is claimed:

1. An apparatus of an optical scanner for scanning a subject, the apparatus comprising:
   interface circuitry including an input to receive a plurality of images of a scene from at least one image-capture device; and
   controller circuitry coupled to the interface circuitry and the input, the controller circuitry operative to cause the optical scanner to perform:
     an idle phase wherein the optical scanner remains idle with respect to image-acquisition parameter setting and image processing corresponding to reading of the subject, except that the controller circuitry is operative to cause the optical scanner to detect any scene change within its field of view occurring since a previous scene evaluation operation;
     a decode phase that is entered into after the idle phase, in response to an activation event, and in response to the optical scanner detecting during the idle phase of an occurrence of a scene change since the previous scene evaluation operation, wherein the decode phase includes:
       performance of a scene evaluation operation that takes measurements of a current scene to determine the operational parameters;
       acquisition of an image using the at least one image-capture device according to the determined operational parameters; and
       processing of the image to perform a reading of the subject; and
     an initial phase that is entered into after the idle phase, in response to an activation event, and in response to the optical scanner not detecting during the idle phase of any occurrence of a scene change since the previous scene evaluation operation, wherein the initial phase includes:
       selection of a predefined configuration of operational parameters for an image acquisition operation without performance of any scene evaluation operation;
       acquisition of an image using the at least one image-capture device according to the selected predefined configuration of operational parameters; and
       processing of the image to perform a reading of the subject.

2. The apparatus of claim 1, wherein in the initial phase, the selection of the predefined configuration of operational parameters is made from among a plurality of predefined configurations of operational parameters.

3. The apparatus of claim 2, wherein the plurality of predefined configurations of operational parameters includes a first configuration having operational parameter values equal to the operational parameter values used most recently to perform acquisition of an image.

4. The apparatus of claim 2, wherein the plurality of predefined configurations of operational parameters includes a first configuration having operational parameter values corresponding to a near-field target, and a second configuration having operational parameter values corresponding to a far-field target.

5. The apparatus of claim 1, wherein the operational parameters include an illumination setting.

6. The apparatus of claim 1, wherein the operational parameters include an autofocus setting.

7. The apparatus of claim 1, wherein the at least one image-capture device includes a plurality of different image-capture devices, and wherein the operational parameters include a selection of a specific image-capture device from among the plurality.

8. The apparatus of claim 1, wherein the scene evaluation operation that takes measurements of a current scene includes at least one measurement selected from the group consisting of: distance measurement, lighting conditions measurement, or any combination thereof.

9. The apparatus of claim 1, wherein in the idle phase, the detection of any scene change within the field of view of the optical scanner occurring since a previous scene evaluation operation includes reading a motion sensor to detect movement of the optical scanner, and wherein a detected change of orientation of the optical scanner that exceeds a defined threshold is indicative of a scene change.

10. The apparatus of claim 1, wherein in the idle phase, the detection of any scene change within the field of view of the optical scanner occurring since a previous scene evaluation operation includes reading a proximity sensor to detect distance to an object, and wherein a detected change of distance that exceeds a defined threshold is indicative of a scene change.

11. The apparatus of claim 1, wherein in the idle phase, the detection of any scene change within the field of view of the optical scanner occurring since a previous scene evaluation operation includes reading the at least one image-capture device to measure a motion vector according to an optical flow technique, and wherein a measured motion vector that exceeds a defined threshold is indicative of a scene change.

12. The apparatus of claim 1, wherein in the idle phase, the detection of any scene change within the field of view of the optical scanner occurring since a previous scene evaluation operation includes performing an operation in a low-power mode of the at least one image-capture device.

13. The apparatus of claim 1, wherein the decode phase is more computationally expensive than the initial phase.

14. A method of operating an optical scanner for scanning a subject, the method comprising:
receiving, by the optical scanner, a plurality of images of a scene from at least one image-capture device;
performing, by the optical scanner, an idle phase wherein the optical scanner remains idle with respect to image-acquisition parameter setting and image processing corresponding to reading of the subject, except that the optical scanner detects any scene change within its field of view occurring since a previous scene evaluation operation;
performing, by the optical scanner, a decode phase that is entered into after the idle phase, in response to an activation event, and in response to the optical scanner detecting during the idle phase of an occurrence of a scene change since the previous scene evaluation operation, including:
performing a scene evaluation operation that takes measurements of a current scene to determine the operational parameters;
acquiring an image using the at least one image-capture device according to the determined operational parameters; and
processing the image to perform a reading of the subject; and
performing, by the optical scanner, an initial phase that is entered into after the idle phase, in response to an activation event, and in response to the optical scanner not detecting during the idle phase of any occurrence of a scene change since the previous scene evaluation operation, wherein the initial phase includes:
selecting a predefined configuration of operational parameters for an image acquisition operation without performance of any scene evaluation operation;
acquiring an image using the at least one image-capture device according to the selected predefined configuration of operational parameters; and
processing the image to perform a reading of the subject.

15. The method of claim 14, wherein in the initial phase, the selection of the predefined configuration of operational parameters is made from among a plurality of predefined configurations of operational parameters, and wherein selecting a configuration from among the plurality of predefined configurations of operational parameters includes selecting a first configuration having operational parameter values equal to the operational parameter values used most recently to perform acquisition of an image.

16. The method of claim 15, wherein selecting a configuration from among the plurality of predefined configurations of operational parameters includes selecting a first configuration having operational parameter values corresponding to a near-field target, and a second configuration having operational parameter values corresponding to a far-field target.

17. The method of claim 14, wherein in the idle phase, the detecting of any scene change within the field of view of the optical scanner occurring since a previous scene evaluation operation includes reading a motion sensor to detect movement of the optical scanner, and wherein a detected change of orientation of the optical scanner that exceeds a defined threshold is indicative of a scene change.

18. The method of claim 14, wherein in the idle phase, the detecting of any scene change within the field of view of the optical scanner occurring since a previous scene evaluation operation includes reading a proximity sensor to detect distance to an object, and wherein a detected change of distance that exceeds a defined threshold is indicative of a scene change.

19. The method of claim 14, wherein in the idle phase, the detecting of any scene change within the field of view of the optical scanner occurring since a previous scene evaluation operation includes reading the at least one image-capture device to measure a motion vector according to an optical flow technique, and wherein a measured motion vector that exceeds a defined threshold is indicative of a scene change.

20. The method of claim 14, wherein in the idle phase, the detecting of any scene change within the field of view of the optical scanner occurring since a previous scene evaluation operation includes performing an operation in a low-power mode of the at least one image-capture device.

\* \* \* \* \*